Nov. 2, 1965    W. N. BASCOM    3,215,976
METHOD FOR SURVEYING AND SEARCHING THE OCEAN BOTTOM AND
RECOVERING OBJECTS THEREFROM
Filed Aug. 30, 1962    5 Sheets-Sheet 1
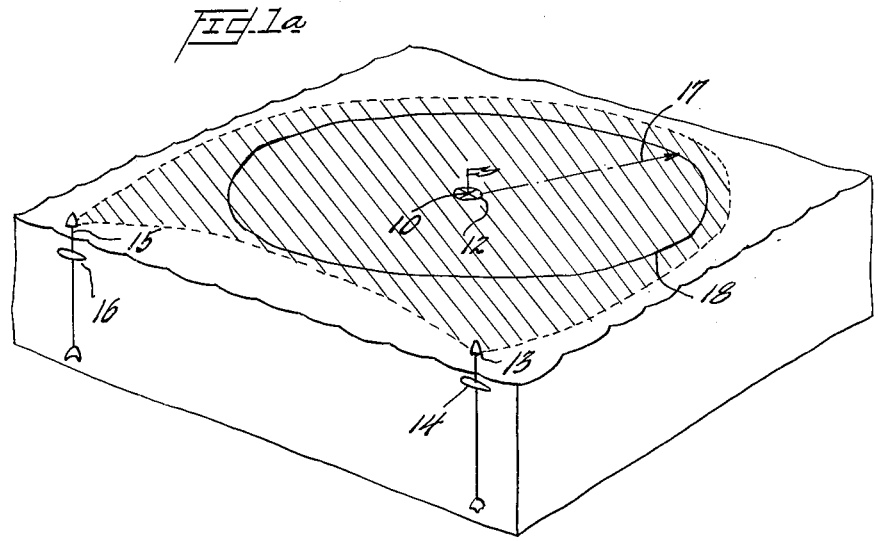
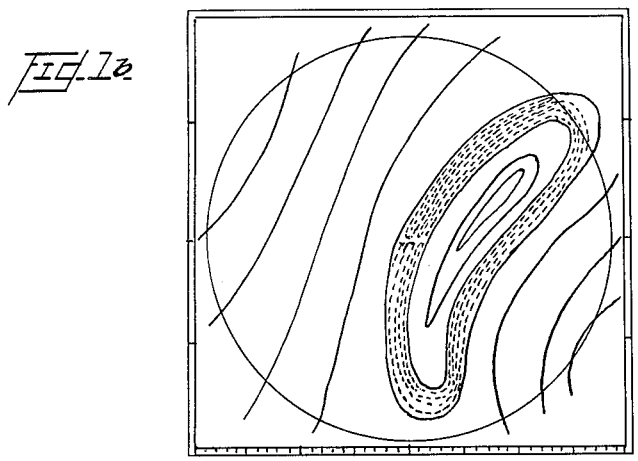
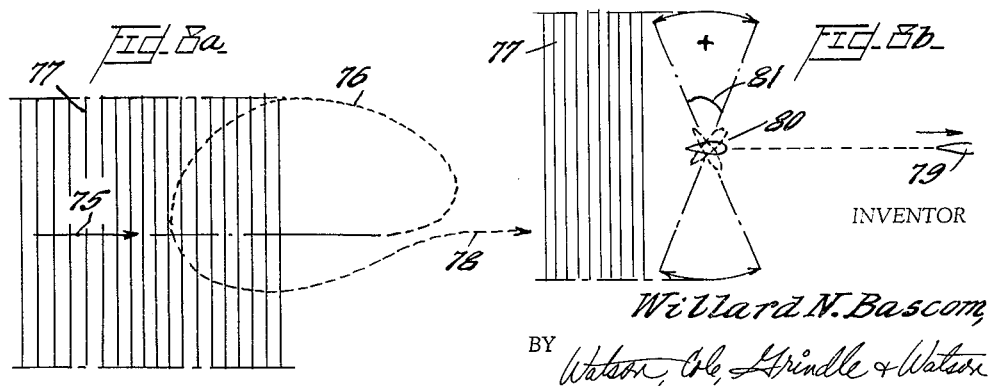
INVENTOR
Willard N. Bascom,
BY
ATTORNEYS Nov. 2, 1965    W. N. BASCOM    3,215,976
METHOD FOR SURVEYING AND SEARCHING THE OCEAN BOTTOM AND
RECOVERING OBJECTS THEREFROM
Filed Aug. 30, 1962    5 Sheets-Sheet 2
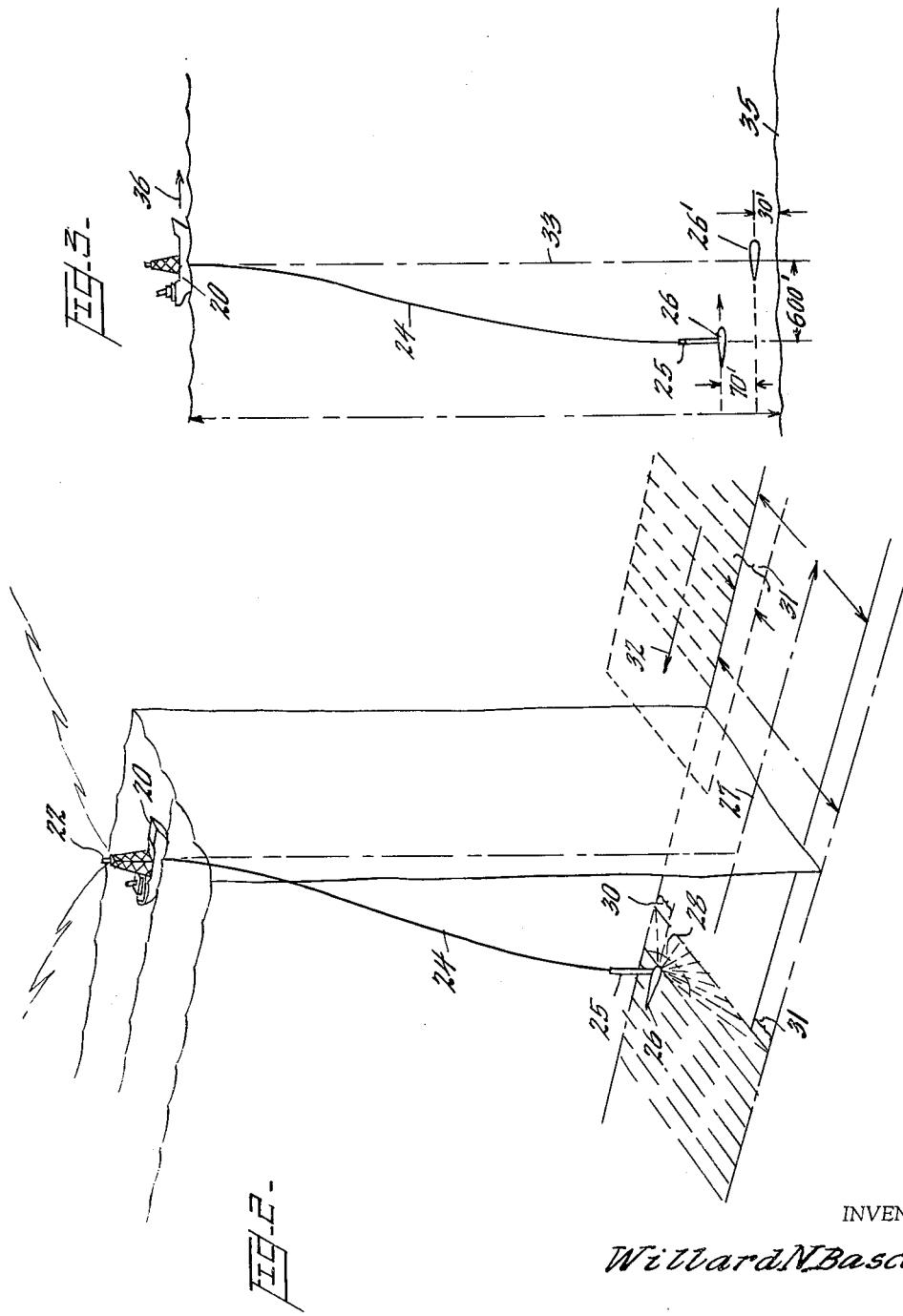
INVENTOR
Willard N Bascom
BY Watson, Cole, Grindle & Watson
ATTORNEYS

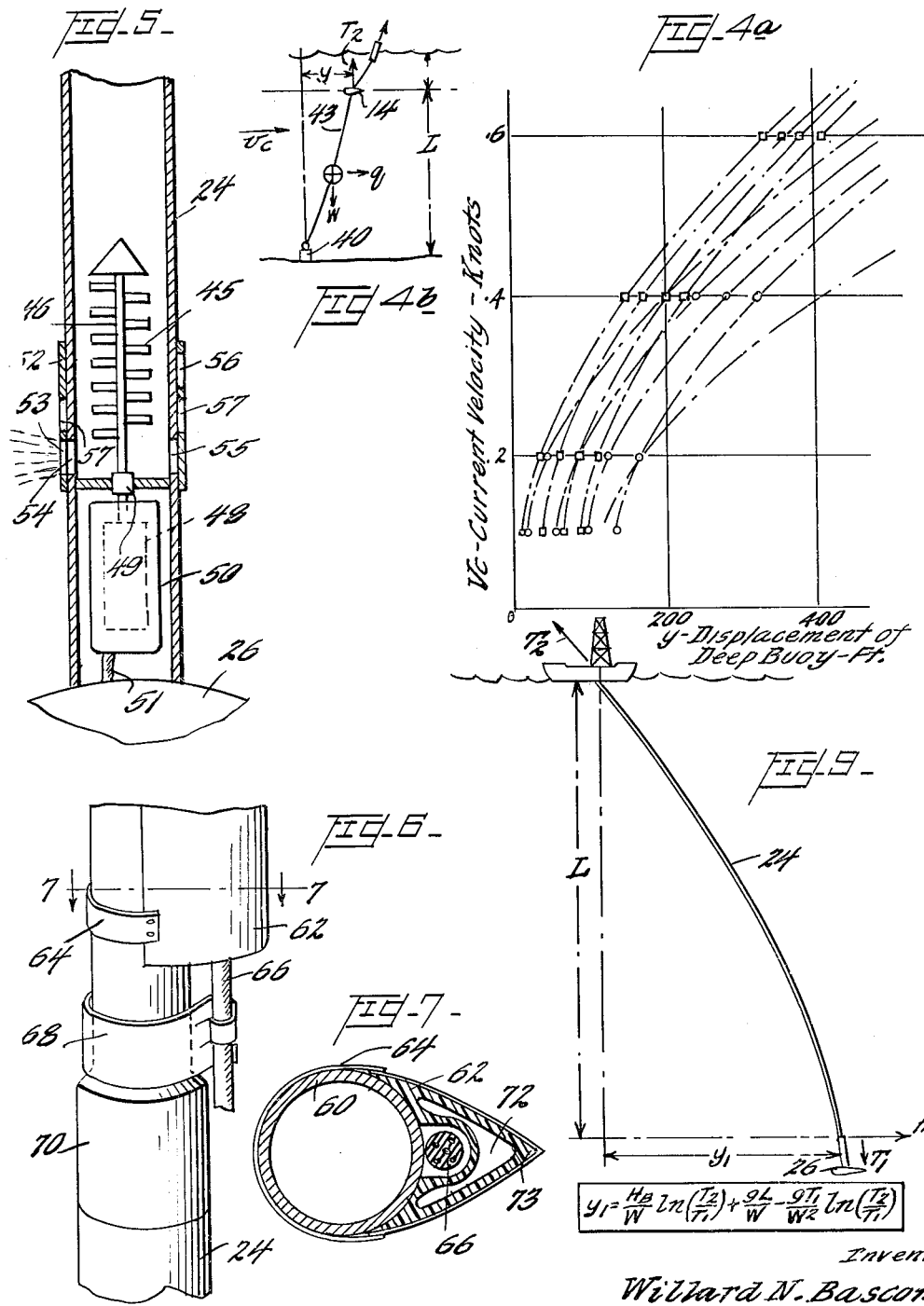

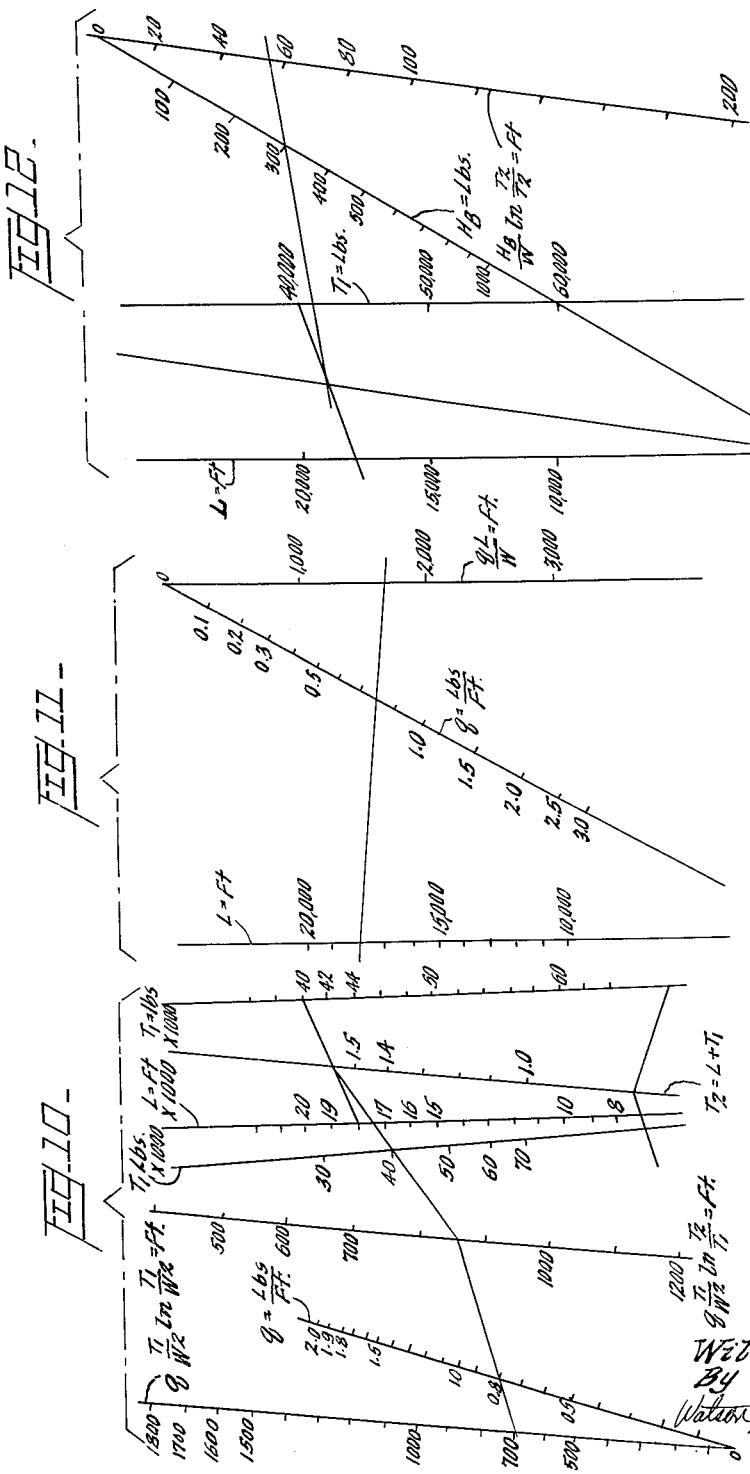

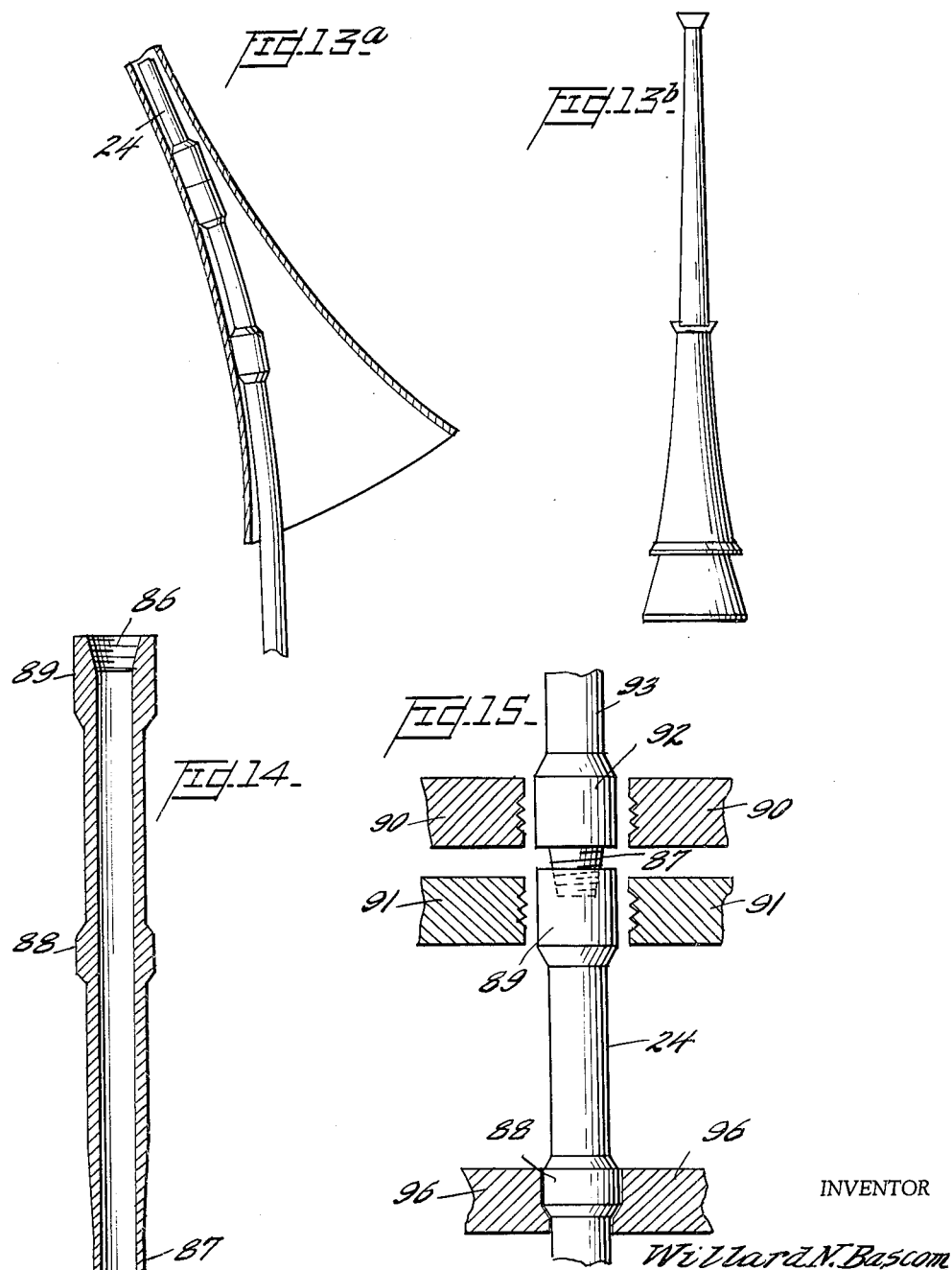

United States Patent Office
3,215,976
Patented Nov. 2, 1965

3,215,976
METHOD FOR SURVEYING AND SEARCHING THE OCEAN BOTTOM AND RECOVERING OBJECTS THEREFROM
Willard N. Bascom, Washington, D.C., assignor to Ocean Science and Engineering, Inc., Washington, D.C., a corporation of Delaware
Filed Aug. 30, 1962, Ser. No. 221,402
12 Claims. (Cl. 340—3)

This application is a continuation-in-part of the copending application, Serial No. 209,406, now abandoned.

This invention relates to a method for thoroughly searching and surveying the ocean bottom with visual, or sonic, apparatus and for locating, identifying and recovering objects on the ocean bottom.

It is known in the art to search the ocean floor in relatively shallow water using shipmounted sonar and/or cable towed sonic means. Such methods become impractical and ineffective for use in deep water because of water interference and the operator's inability to known where the cable towed sensing packet is in relationship to the towing vessel.

It is also known in the art to retrieve objects from the deep ocean floor by random grabbing with devices on the end of wire lines. The weight lifting ability of such wire lines is highly restrictive and no satisfactory means existed to precisely locate and pick up a specific object at a specific spot in the deep ocean.

For the purposes of this application the term shallow water means water having a depth of the order of 100 fathoms and includes waters over the continental shelf and near shore areas.

Accordingly, it is an object of this invention to provide a method for surveying and searching the ocean bottom beyond the continental shelf.

It is another object of this invention to provide a method of searching and surveying the ocean bottom at depths of the order of 20,000 feet.

It is another object of this invention to provide a method for searching the floor of the ocean at a high rate on a precisely known and recorded pattern, to stop when required, to identify objects on the ocean floor.

It is another object of this invention to provide a method of retrieving objects from the ocean floor after such objects have been found and identified.

Briefly, this novel method includes the following steps:

(1) Establishing the approximate center of the search area on the surface of the earth by means of known navigational techniques.

(2) Marking the center point of the area to be searched with a deep-moored buoy system.

(3) Installing two or more other deep-moored buoy systems equipped with shoran, sonar and radar transponders at a distance from the center point such that good intersections can be obtained by means of shoran, radar and sonar.

(4) Making a detailed bathymetric (bottom topography) survey of the area to be searched by means of an echo sounder mounted on the ship. During the course of this step a number of functions are performed:

(a) A precise track is kept of the position of the ship relative to the buoys by any well-konwn means such as by the use of shoran or radar.

(b) Once an area is surveyed and bottom contours established and a search plan is formulated, the ship lowers the electronic sensing elements (sonar transducer and television cameras) on a pipe until the sensors are relatively near the bottom and the search begins.

(c) The ship supports a length of pipe, or tubing, sufficient to reach near the ocean floor and methods of assembly and disassembly of the pipe are employed such that the pipe length may be changed at the rate of the order of 50 feet per minute. Advantageously, the pipe supports a sensing packet connected to the weighted bottom of the pipe and a streamlined fairing is attached to the pipe to reduce the drag, improve the maneuverability and enclose power and signal cables.

(d) The ship is moved along predetermined courses trailing the faired pipe with its sensing packet near the ocean floor, constantly scanning the ocean floor with a high resolution shadow-type sonar, plotting objects detected on a chart.

(5) Moving the ship in any direction including skewed and sidewise at speeds of the order of three feet per second and holding the ship in position against wind and currents while the steps of identification and pick-up are being carried out by a second ship or by the first ship at a different time.

(6) Inspecting and identifying all detected objects that "shine" or rise above the ocean floor. During this inspection, the ship is moved to pass the sensing packet over or near the object a second time with a different aspect; moving the ship in a direction such that the sensing packet approaches the object and slowly rotating the pipe so that the sonar detector is moved from side to side with respect to the object. During the inspection, the television, which is also located in the sensing packet, is turned on, and lights are turned on, and the pipe is moved back and forth relative to the object by means of a stream of water which flows down the pipe and issues from an orifice on one side of the pipe to give a jetting effect.

(7) Lowering the pick-up tongs and guiding them to the object to be grasped; grasping the object and retracting aboard ship the pick-up tongs and the pipe.

These and various other objects and features of the invention will be more clearly understood from a reading of the detailed description of the invention in conjunction with the drawing in which:

FIGURES 1a through 3 are pictoral drawings illustrating certain steps of this novel method;

FIGURE 4a is a graphical representation of a number of solutions of an equation for determining the displacement of the buoy for different values of water current;

FIGURE 4b is a pictoral drawing for a moored buoy employed in this novel method;

FIGURE 5 is a view, in elevation, partly in section, of a portion of the apparatus employed in this novel method;

FIGURE 6 is a perspective view, in elevation, of a portion of the cable, pipe and fairing employed in this novel method;

FIGURE 7 is a view, in section, taken along the line 7—7 of FIGURE 6;

FIGURES 8a and 8b are graphical representations of the ship's course and sonar sweep employed in this novel method;

FIGURE 9 is a view, in elevation, illustrating to an exaggerated scale, the displacement of the sensing packet relative to the ship;

FIGURES 10, 11, and 12 are nomographs representing solutions of portions of the equation utilized for the computation of the displacement of the sensing packet relative to the ship as illustrated pictorally in FIGURE 9;

FIGURES 13a and 13b are views in elevation and plan, respectively, of the pipe guide shoe mounted on the ship;

FIGURE 14 is a view, in section, of a tool joint and the pipe used in this novel method; and FIGURE 15 is a view, in elevation, of a section of the pipe employed in this novel method with equipment for the connection and disconnection of sections of the pipe.

Referring now to FIGURE 1a, there is depicted a perspective view of the area to be searched according to the method of this invention. According to the first step of this method, the approximate center of the search area is established by means of standard navigational techniques, such as celestial navigation, loran, or other well known method. In the case of locating a missile fragment such as a nose cone, the approximate center would be the best known impact position. For the purposes of this explanation, it is assumed that the approximate center 10 is within five miles radius of the actual impact point. After the approximate center has been located by standard navigation techniques, the center point 10 is marked by a deep moored buoy arrangement indicated by float 12. The details of this buoy system will be subsequently described. Preferably, the float is equipped with lights, shoran, and radar transponders, or a combination thereof while the buoy, not shown, to which the float is tied contains the sonar transponder and is approximately 200 feet below the surface. These various systems are important from the standpoint of maintaining constant communication with the center buoy arrangement to facilitate the accurate searching of the predetermined area.

The next step is to install two or more additional deep moored buoy arrangements such as buoys 14 and 16 and their associated floats 13 and 15, in FIGURE 1a. These buoys are also equipped with shoran and radar transponders and are anchored at such a distance that favorable intersections can be obtained. In this illustrative example, buoys 14 and 16 form a roughly equilateral triangle with the center float 12, which triangle is approximately 10 miles on each side, assuming that a five-mile radius search is to be made. It is understood, of course, that additional buoys and shoran transponders would increase the reliability of the system. In searching, these buoys are the only navigational references employed for surveying and precisely re-establishing position. Each point in the search is known relative any other point in the search pattern at any time within about 200 feet. The radius 17 determines the circular area 18 which is to be searched.

Next a detailed bathymetric (bottom topography) survey such as disclosed in FIGURE 1b is made of the area to be searched by means of a ship-mounted echo sounder. In performing this step, the area is mapped and contoured and a search course is established which permits the sensing device to be kept at a relatively constant depth for the maximum practical time. This sensing device connected to the bottom of a pipe which is lowered from the ship, the lower end of the pipe being heavily weighted (with, for example, 15 tons of drill collars) so that it maintains a position close to the vertical position (for example, 600 feet at 2 feet per second) under the ship as the ship is moved along the predetermined path, as indicated by 26. Advantageously, four large outboard motors are mounted on the ship, two on the starboard side and two on the port side, two of the motors being forward and the other two being aft with respect to the mid section of the ship. Each of these motors is connected to and controlled at a central control point so that both their speed and direction can be simultaneously or independently controlled. With this combination of power sources, the ship may be moved at a relatively low speed while sufficient forces are developed by the motors to cancel the effect of wind and ocean currents. Thus, it is possible to move the ship at a speed of two to three feet per second which would permit the sensing device to maintain a position close to a vertical line under the center of the ship.

FIGURE 1b is a sample chart showing the results of a survey showing paths to be searched in dotted lines. It is to be noted that these dotted line search paths are substantially parallel to the contour lines. Merely by way of example, the chart might be 40 inches square and the scale of 1 inch to 2,000 feet employed. The contour intervals, shown in solid lines (obtained from the previously mentioned survey) might be 60 feet. With these assumptions, the dotted line paths could be searched in a period of approximately one and one-third days if the search rate were three feet per second.

As indicated in FIGURE 2, the ship 20 has a suitable antenna 22 or other transducer for receiving shoran, sonar or radar signals mounted thereon for the purpose of maintaining constant contact with the buoys. The pipe 24 weighted by drill collars 25 is lowered from the ship with a sensing device 26 on the lower end thereof. In the example of FIGURE 2, the depth of the ocean floor is 18,000 feet and the ship is being moved along a line corresponding to line 27 on the ocean floor. During this movement of the ship, a sonar beam is being transmitted and received by the sensing device 26 along a path perpendicular to arrow 27, the beam being restricted to a predetermined area as is indicated by the angle 28 (for example, at these heights of the transponder above the bottom, 1,000 feet each side). The width of this beam is chosen with respect to the height of the sensing device 26 above the ocean floor so that an area of overlap is provided between subsequent passage of the ship along the area being searched. This area of overlap is indicated by brackets 30 and 31. Each passage of the ship along the area being searched is preferably made in a direction opposite to the previous passage as noted by comparison of the direction of arrows 27 and 32.

The displacement of the sensing device 26 relative to the vertical line 33 beneath the ship is indicated in FIGURE 3. Assuming that the ship 20 were stopped and held in a stationary position by means of the four motors previously described, the heavily weighted pipe and its sensing device would cause the pipe 24 to assume a position corresponding to line 33 and the sensing device would assume a position 26' which is relatively close to the ocean floor 35. If now the ship is caused to move in a direction to the right of FIGURE 3, as indicated by arrow 36, at a speed of the order of two feet per second, the sensing device 26 will assume a position approximately 600 feet behind the ship and approximately 70 feet above its rest position indicated by 26', these figures being based upon a depth of approximately 18,000 feet. The details of this calculation will be subsequently described.

During the course of this searching all objects that "shine" i.e., reflect sonar beams, or rise above the bottom, are inspected in detail. This is done by stopping the ship and backing the ship until the sensing device is lowered in a position closely adjacent the ocean floor 35 as indicated by the sensing device 26'. This step is usually employed after the original detection and plotting of the object on the chart at which time the ship is turned without stopping to permit the sonar to scan the object a second time using a different aspect. After the second pass, the decision as to whether or not to inspect the object with television is made. If it is decided not to inspect the object with television, the ship completes a smooth circle into its original course. When the ship is backed over the object, the sonar transducer is turned from side to side by turning the pipe to get a complete response from the object.

When the ship is directly over the object being surveyed and the pipe 24 is in a straight vertical position, as indicated by line 33 of FIGURE 3, it may be necessary to shorten or lengthen the pipe. This is accomplished by removing or inserting a joint or two at the top, that is, aboard the ship. The position of the ship above the object is obtained by sonar, television and lights are turned on and the pipe is moved slowly back and forth relative to the object by means of a jet stream pumped down the pipe from the ship and issuing from one side of the pipe in a manner which will be subsequently described. If it is desired to retrieve the object, such as a nose cone, pickup tongs are lowered from the sensing device 26 and the object is grasped. The pipe and the pickup tongs are then retracted.

Throughout the survey it is essential to know the position of the ship relative to the search pattern with an accuracy of about 200 feet. This location of the ship is determined with respect to the shoran floats 12, 13 and 15 shown in FIGURE 1a. The details of these floats are described with respect to FIGURE 4b. The taut line—deep moored buoy arrangements were disclosed by Willard Bascom in Scripps Institution of Oceanography Report 53–38 (1953) and in Experimental Drilling in Deep Water, National Academy of Sciences 914 (1961).

Referring now to FIGURE 4a, there is depicted a graphical plot of buoy displacement for ocean current velocity, the various forces and descriptions of which are indicated in the sketch 4b. Although several methods are available to calculate the horizontal displacement of a deep moored buoy arrangement such as the distance of buoy 14 from a point above its anchor 40, the most convenient definition proved to be the following:

$$Y = \frac{H}{w} ln \frac{T_2}{T_1} - \frac{qL}{w} + \frac{T_2}{w^2} q ln \frac{T_2}{T_1} \qquad (1)$$

where:

$Y$ = horizontal displacement of the cable 43 from its point of anchor 40 at a depth, L
$H$ = horizontal force resulting from drag on components above depth L
$W$ = weight per unit length of cable in water
$q$ = drag force per unit length of cable; can take on negative values when in a direction opposed to H
$T_1$ = tension at the anchor point
$T_2 = wL + T_1$ = tension in the cable 43 at depth L above anchor point The advantage of the formula above is to provide a comparison of the mooring efficiency of wires of various sizes in terms of displacement for given conditions and thus assist in selecting wire sizes and buoys (which determine tension).

In FIGURE 4a, three families of curves are plotted. The dash line curves indicate graphical solutions having different values of horizontal force H for each size cable. The solid line curves represent graphical solutions of Equation 1 for four other values of horizontal force H for a different size cable, while the third family of curves indicated by chain lines indicates graphical representations of solutions of Equation 1 for still other horizontal forces on a third cable. The first family of curves is for the smallest of the three cables, while the third mentioned family of curves is for the largest of the cables. Thus, by the use of Equation 1, it is possible to accurately calculate the position of the anchor 40 relative to the buoy 14. It is to be noted that the float 13 in FIGURE 12 is employed to support the radar and shoran transponders for acurately locating the ship. It is also used as a device for visually locating the deep buoy 14 when it is desired to retrieve the deep buoy 14.

Certain of the details of the system are disclosed in FIGURE 5 which shows a section of pipe 24 in elevation near the point where the pipe is connected to sensing device 26. Rotatably mounted within the pipe is a turbine rotor 45 which is connected by means of a shaft 46 to the rotor 48 of an electric generator 50. Advantageously, the generator is sealed within the pipe 24 by suitable means, such as by an annular bushing 49 which encircles the shaft 46. The pipe 24 has openings 54 and 55 in opposite sides thereof and when sea water is pumped down the pipe 24, this water causes the turbine rotor 45 to rotate thereby generating electricity in generator 50. This electricity is fed into the interior of the sensing device 26 by means of cable 51 and is employed to energize the television, lights, and sonar, none of which are shown. An annular ring 52 is slidably mounted on the exterior of pipe 24 and may be slid along the pipe by suitable means, such as an electromagnet, not shown. Ring 52 has three possible positions, one in which opening 53 is aligned with opening 54, one in which opening 56 is aligned with opening 55 and one in which two openings 57 are aligned with openings 54 and 55. With this arrangement, selective jetting action can be employed to directionally move the pipe and thus accurately position the sensing device 26. From the above discussion it is apparent that water pumped down the inside of the pipe accomplishes either one or two purposes: one, to turn the turbine 45 which generates electric power, or, two, to move the bottom of the pipe and the attached sensing device in any desired direction by jet reaction.

The details of the pipe assembly are shown in FIGURES 6 and 7. This assembly includes sections of pipe such as a three and one-half inch steel tubing 60 to which is attached a streamlined faring 62 which may be formed of a suitable plastic material. The faring 62 may be secured to the pipe 60 by means of straps, such as strap 64. An electric conductor cable 66 is retained adjacent the pipe 60 by means of the fairing as best seen in FIGURE 7. The cable 66 is supported at spaced cable clips 68 which rest upon pipe joints 70. Thus, the cable is supported at each joint and it is only necessary that the cable have sufficient tensile strength to support a relatively short length of cable between joints. Advantageously, the fairing 62 may be substantially hollow as indicated by the channel 72 which runs longitudinally of the fairing. This passage is opened to sea water so that it encounters no compressive stresses in the depths of the ocean. The fairing 62 is relatively streamlined in cross section and tapers to a point 73, as best seen in FIGURE 7. The addition of this fairing to the cable reduces the drag coefficient of the pipe from about 1.2, the value which it would have in the absence of the fairing, to a value of about 0.3 with the fairing. This has the effect of securing the electric cable so that it cannot flutter, of reducing the force required to pull the pipe and of permitting the pipe to hang more vertically while being towed.

Referring now to FIGURES 8a and 8b, there are depicted in graphical form certain of the steps employed in this method. In FIGURE 8a, the path of the ship is indicated by arrow 75 and the dotted line path 76 indicates the path taken by the ship in circling an object which has been detected on the ocean floor. The rectangular areas 77 indicate areas on the ocean floor which have been surveyed by means of sonar. In this particular instance, it is assumed that a detailed inspection of the object discovered is not desired and, after the ship takes the circular path indicated by dotted line 76, the ship returns to its course along the dotted line 78.

In FIGURE 8b, however, it is assumed that the ship has detected an object to be inspected in detail and when the ship completed the circular path indicated by dotted line 76 of FIGURE 8a, the ship is stopped at position 79 and the direction of movement of the ship reversed to move the ship into position 80 at which time the pipe 24 is rotated through an angle 81 causing the sensing device to sense a triangular area.

As best seen in FIGURE 9, the lateral displacement "y" of the sensing device 26 is determined by Equation 2

$$y = \frac{Hb}{w} ln \left(\frac{T_2}{T_1}\right) + \frac{ql}{w} - \frac{qT_1}{w^2} ln \left(\frac{T_2}{T_1}\right)$$

in which:

$H_b$ is the horizontal force resulting from the drag on the pipe 24 and the sensing device 26.
$w$ is the weight of the drill collars.
$T_1$ is the tension on the pipe above the collars.
$T_2$ is the tension of the pipe at the ship 20.
$q$ is the drag force per unit length of pipe in pounds per foot.
$l$ is the vertical length of the pipe.
$l_n$ is the abbreviation for natural logarithm.

FIGURES 10, 11 and 12 are nomographs for the purpose of quickly determining the solution of Equation 2.

FIGURE 13a is a side view, in elevation, partly in section, of the pipe guide shoe located at the ship for evenly distributing the bending stress in the pipe along a relatively long radius of curvature.

The guide shoe may be characterized as a trumpet pointing downwardly with a fixed radius of curvature R to prevent kinking of the pipe. Advantageously, the stress in the pipe shown in FIGURE 13a has a value equal to $$\frac{1}{R} = Er$$

where R is the radius of curvature, E is equal to Young's modulus and r is the radius of the pipe between coupling joints. FIGURE 13b is a view in elevation of the guide show and, in this illustrative embodiment, is approximately 27 feet long and has a diameter at its lower end of approximately six feet. The diameter of the pipe is approximately three and one-half inches.

FIGURE 14 shows one form of tool joint employed in the pipe 24 to facilitate the rapid connection and disconnection of the pipe. The joint consists of pipe section 85 having a threaded female end 86 on one end and an opposite threaded male end 87. Advantageously, between the tool joints near the female end a second upset 88 is located which makes it possible to transfer the weight of the pipe from the elevator to the rotary table without resorting to the use of slips. With these double-upset tool joints it is possible to assemble and to disassemble the pipe at the rate of the order of 50 feet per minute.

The term "upset" is employed to designate a thickened section of pipe and the term "double-upset" is used to describe a section of pipe having two thickened portions, such as pipe section 87 in FIGURE 15 which has thickened sections 88 and 89. The double-upset tool joints may be formed integrally with the pipe as indicated in FIGURE 14 or they may be formed separately and secured to the pipe in any convenient manner such as by welding.

These upsets are gripped by suitable devices when joining or disconnecting the sections. For example, elevators and a rotary table 96, only a portion of which is shown, may be employed to support the length of the pipe which extends below the ship while two pairs of power tongs 90 and 91 are employed to grip upsets 92 and 89, respectively. Power tongs 91 are held stationary while tongs 90 are rotated to thread or unthread the sections of pipe for assembly and disassembly respectively. In one illustrative embodiment employed at a depth of approximately 18,000 feet, the pipe 24 was of three and one-half inch steel tubing weighted with 30,000 pounds of drill collars.

While I have shown and described certain illustrative apparatus and described certain steps in conjunction with the novel method of this invention, it is understood that the concepts thereof may be applied to other embodiments without departing from the spirit and scope of this invention.

What is claimed is:

1. The method for surveying the ocean bottom from a moving ship equipped with navigation equipment for determining location relative to a plurality of positioned transponders, comprising the steps of (1) establishing the approximate area of search by known navigational techniques, (2) marking such area by a first deep moored buoy equipped with a transponder, (3) defining an area of search by locating a plurality of further deep moored buoys equipped with similar transponders about the search area, (4) moving the ship along a predetermined pattern in said area of search by means of the navigation equipment on the ship responding to the transponders, (5) making a detailed bathymetric survey of the topography of the sea floor along said pattern with an echo sounder located on said ship to establish bottom contours, (6) formulating a specified search plan on the ocean floor following said contours at a relatively constant depth, (7) lowering a sensing element on the end of a pipe vertically under the ship near the bottom, and (8) moving the ship about the contours in accordance with said plan to keep the sensing element at a relatively constant distance from the bottom.

2. A method according to claim 1 including the step of recording the precise position of the ship relative to said deep-moored buoy systems while making said bathymetric survey.

3. The method according to claim 1 wherein the sensing element is lowered on a weighted pipe with fairing elements thereon.

4. The method according to claim 3 wherein the pipe is towed by the moving ship in the pattern conforming with said search plan with the faired pipe oriented to move through the water with less resistance thereby reducing the tendency of the pipe to move from its vertical position beneath the ship.

5. The method according to claim 3, further comprising the step of constantly presenting the information obtained on the ship instantly via a cable secured within the fairing on the outside of the pipe.

6. The method according to claim 5 further comprising the step, of continually determining the precise position of the sensing element relative to the ship.

7. The method according to claim 5 including the step of moving the sensing element over the bottom a second time with a different aspect by rotating the pipe through a predetermined scanned angle.

8. The method according to claim 7, further comprising the steps of inspecting and identifying objects which are detected.

9. The method according to claim 3, further comprising the step of generating electricity at the bottom of the pipe to provide power for the sensing element by forcing a stream of water down the pipe to actuate a turbine in the pipe, which turbine is connected to a generator.

10. The method according to claim 7, including the step of providing said pipe with an orifice adjacent the sensing element and wherein the method includes the step of moving the sensing element by pumping a stream of water down through the pipe and out of the orifice to give a jetting effect thereby moving the sensing element for accurately positioning same.

11. The method according to claim 10 further including the step of lowering pick-up means connected to the pipe to retrieve objects on the ocean floor.

12. The method according to claim 9, including the step of providing said pipe with an orifice adjacent the sensing element and wherein the method includes the step of moving the sensing element by pumping a stream of water down through the pipe and out of the orifice to give a jetting effect thereby moving the sensing element for accurately positioning same.

References Cited by the Examiner

UNITED STATES PATENTS

| 917,201 | 4/09 | Vollmer | 114—151 |
|---|---|---|---|
| 2,326,880 | 8/43 | Norrman | 340—3 |
| 3,353,360 | 7/44 | Ronning | 340—4 X |
| 3,005,973 | 10/61 | Kietz | 340—3 |
| 3,032,105 | 5/62 | Reistle | 340—4.5 |

OTHER REFERENCES

"Navy to Get Underwater Drone," Electronics, vol. 33, Nov. 30, July 22, 1960 (pp. 46 relied on).

Scientific American. vol. 204, No. 6, June 1961 (pp. 183 relied on).

"Shoran for Surveying," by Kroemmelbein, Electronics, March 1948 (pp. 112–117 relied on).

CHESTER L. JUSTUS, *Primary Examiner.*